April 23, 1968 F. J. BRACEY, JR 3,379,814
SCORING THERMOPLASTIC MATERIALS
Filed March 30, 1965 2 Sheets-Sheet 2

INVENTOR.
Frederick J. Bracey, Jr.
BY
James F. Snowden
Attorney

United States Patent Office 3,379,814
Patented Apr. 23, 1968

3,379,814
SCORING THERMOPLASTIC MATERIALS
Frederick J. Bracey, Jr., Somers, Conn., assignor to Mobil Oil Corporation, a corporation of New York
Filed Mar. 30, 1965, Ser. No. 443,909
10 Claims. (Cl. 264—322)

ABSTRACT OF THE DISCLOSURE

Thin thermoplastic sheet materials, such as polymeric styrene compositions, are scored with the scoring blade or the sheet material or both heated to temperatures which are correlated according to the temperature diagram of the accompanying FIG. 1 and with the stroke of the scoring blade restricted to maintain a minimum clearance between the scoring blade in its advanced position and the backing member which supports the sheet material. Scored grooves of uniform depth are produced without the fracturing or splitting commonly encountered. The scoring operaiton is particularly suitable for producing tear strips for containers or other articles.

---

The present invention relates to scoring or forming grooves by heat and pressure rather than abrasion in relatively thin layers of thermoplastic materials, such as sheets or walls of articles made of these materials. In one embodiment, it is particularly concerned with forming tear strips which are scored deeply enough to be torn readily by hand. The new method is especially suitable for scoring layers of plastic materials which are subject to fracturing or splitting in conventional scoring operations.

Various techniques have been proposed for the grooving or scoring of thermoplastic materials. While these have been successful in many applications, difficulties are encountered in the scoring of relatively thin sheets of certain polymeric materials, as exemplified by homopolymers and copolymers of styrene, which tend to fracture under the pressure of the scoring knife before the material has been scored deeply enough to produce a tear strip which may be torn off cleanly with only moderate force. In providing tear strips on various packages and containers, it is desirable to leave an amount of material in the groove, which is relatively thin but still tough enough to provide a good seal on the package and also to avoid any tendency toward splitting and exposing the contents of the package to air or moisture.

It has been found that polystyrene and other thermoplastic materials which fracture easily may be consistently scored to produce tear strips of reliable tearing characteristics by a novel combination of scoring conditions.

The novel scoring technique comprises disposing relatively thin thermoplastic metarial having a total thickness greater than about 10 mils (0.010 inch) between a backing member and a blade of a scoring member, said material comprising at least one layer and with no layer thereof having a thickness less than about 5 mils, maintaining said blade at a temperature corresponding with one of the rectangular coodinates of a point located within the area designated ABCDE in the accompanying temperature diagram, maintaining said material at a correlated average temperature corresponding with the other rectangular coordinate of said point and pressing said material with said blade and said backing member in contact with opposite faces of said material by exerting a pressure sufficient to score a groove therein to a depth predetermined by maintaining a predetermined minimum clearance between said blade and said backing member while regulating said pressure to avoid parting said thermoplastic material.

Narrower aspects of the invention relate to the scoring of material with fracturing characteristics, such as thermoplastic material derived from styrene, especially high impact copolymers of styrene and rubbery polymers; preferred scoring temperatures and pressures; blade bevels and clearances; the use of two scoring blades, and the substantially equal scoring of two or more layers of heated thermoplastic material at elevated temperatures with a single scoring edge or knife operating against a backing member with a relatively flat surface. These and other features and benefits of the invention will be apparent to those skilled in the art upon consideration of the detailed disclosure herein.

For a better understanding of the invention, reference should be had to the accompanying drawings in which the thickness of layers of material being scored has been exaggerated considerably for better illustration as well as to the following description. All temperatures are expressed herein as degrees Fahrenheit (° F.).

Figure 1:
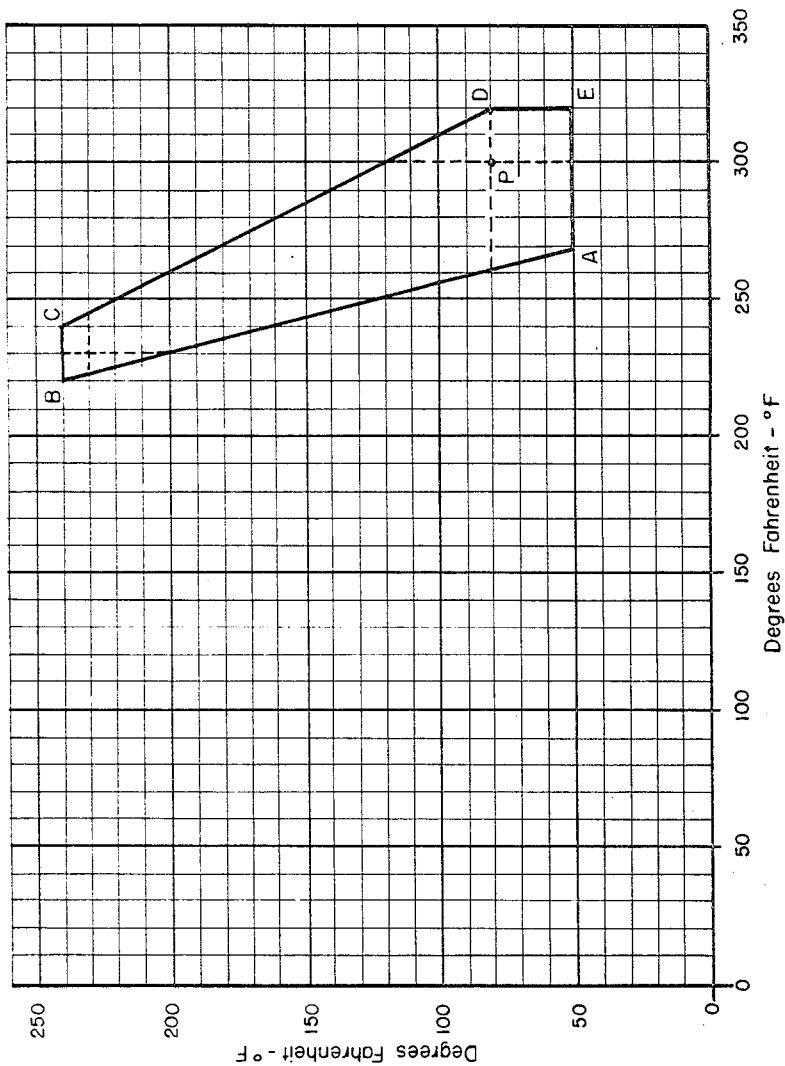
FIG. 1 is a temperature diagram or graph setting forth a correlation of suitable temperatures for both the thermoplastic material and the scoring blade during the scoring operation as rectangular or Cartesian coordinates.

Turning now to FIG. 1, it will be noted that both the abscissa and ordinate scales of the graph are graduated in degrees Fahrenheit. Either of these scales may represent the average temperature of the thermoplastic material being scored with the other scale representing the temperature of the edge of the scoring blade or blades. The latter temperature may be considered as constant in any given operation since the blade is commonly constructed of a metal or alloy, such as tool steel, which possesses a sufficiently high heat conductivity to minimize variations in temperature along the length of the blade.

In the present method, the thermoplastic materials may be heated to suitable elevated temperatures and then scored by pressing unheated blades thereagainst, or the blades may be heated to specified temperatures for scoring unheated materials, or both the blades and the materials may be heated to suitably related elevated temperatures for the operation.

The correlation of blade and material temperatures is important in the present invention and such correlation is defined by the rectangular coordinates of any point lying within the area enclosed by the irregular polygon ABCDE of FIG. 1. For example, in the case of the point P, this may represent a situation in which the average temperature of the layer or layers of thermoplastic material being scored (excluding the local temperatures along the line of the score or groove, which may be affected by the temperature of the scoring blade) is 80° F. as denoted by the ordinate (vertical rectangular coordinate) of point P and the scoring blades are at a temperature of 300° as denoted by the abscissa (horizontal rectangular coordinate) of point P. Conversely, in using the temperature diagram substantially equivalent results will be obtained by maintaining the thermoplastic material at 300° and scoring it under the pressure of a blade maintained at 80°. However, it is not intended that both the material and scoring blade temperatures may be simultaneously represented by the same coordinate.

Generally, when most or all of the heat needed for scoring is furnished by a heated blade, a slightly longer scoring or pressing time is required in order to allow the heat to be transmitted or conducted from the scoring edge through the plastic material than is the case when the material is at a temperature equal to or greater than the blade temperature. While this increase in scoring time is somewhat greater in scoring layers of thermoplastic material that are thicker than usual, the time increment is still relatively small and usually of the order of fractions of a second.

The diagrammed area of temperatures establishes a suitable range of blade temperatures for any given material temperature and vice versa.

For example, with an average material temperature represented by the ordinate of point P, namely 80°, it is apparent by reference to the broken horizontal line in the temperature diagram passing through P, that abscissae representing correlated blade temperatures may be as low as about 260° or as high as about 320° while still remaining within the area ABCDE. With the scoring edges at temperatures below 260°, the thermoplastic layers are not scored deeply enough, at least within a time interval (dwell time) feasible for commercial operations. Such partial scoring is particularly undesirable in the case of tear strips on packages or containers inasmuch as an insufficiently scored tear strip not only requires the application of excessive force for tearing but also the line of actual separation is likely to be erratic and thus depart from the score line. Defects of this nature tend to produce considerable spillage or waste of the contents of packages, etc.

On the other hand, if the unheated thermoplastic material is scored with knife blades maintained at temperatures above 320° F., one or more layers of material usually split through or part along the tear line even though a proper minimum blade clearance is maintained. Parting is most prevalent near the edges of the plastic material being scored. This separation is not the result of the knives actually cutting or slicing through the full thickness of the material, for a limit or stop device is employed to restrict the forwarded movement of the scoring edge and maintain a predetermined final or minimum blade clearance so that the blade does not touch the opposing blade. Instead, it is a splitting of the plastic material caused by the forceful wedging action of the angular scoring edges bearing against thermoplastic material which has been softened too much along the score line by the excessive blade temperature.

In the graph, the broken vertical line within the charted area which passes through point P indicates that with a blade temperature represented by an abscissa of 300°, suitable material temperatures range from about 50 to 120° on the ordinate scale, and also that material temperatures of say 200° or 300° are excessive in this instance and conducive to the parting of the layers. Conversely, from the same line, it may be determined that for material represented by an abscissa temperature of 300°, appropriate blade temperatures (ordinates) are in the range of about 50 to 120°.

Thse polygonal temperature diagram is of an empirical nature and two correlations of material and blade temperatures are possible near the top of the diagram within limited range of 220–240° F. This is due to the intrinsic nature of the diagram in which temperatures from 50 to 240 are included within the charted area as ordinates and temperatures from 220 to 320 are included as abscissa; however, this slight overlapping of ranges need create no difficulties. For any selected material (or blade) temperature between 220 and 240°, both ranges of blade (or material) temperatures should be determined, and it will be found that the broadest spread of temperatures derived therefrom will be suitable for the practice of the present process. For example, with a material temperature of 230° F. expressed as an ordinate, the abscissae along the 230° horizontal broken line within the diagram indicate that the blade temperature may range from about 222 to 245°; while applying the 230° material temperature as an abscissa produces ordinates along the vertical dotted line of about 200–240° F. as the blade temperature range. These two ranges of blade temperatures are then combined in determining a 200–245° F. overall range of blade temperatures which is appropriate for scoring material at the stated temperature of 230°.

The accompanying temperature diagram of FIG. 1 has primary application to scoring plastic compositions derived from at least a major proportion of styrene, and particularly to impact resistant, modified polystyrenes containing copolymers of a polymeric elastomer and a major proportion of styrene. However, it also has considerable, although somewhat less precise, application in determining suitable correlated temperatures for scoring many other thermoplastic resins, especially those with softening or plastic flow temperatures approximating that of the polystyrene.

Figure 2:
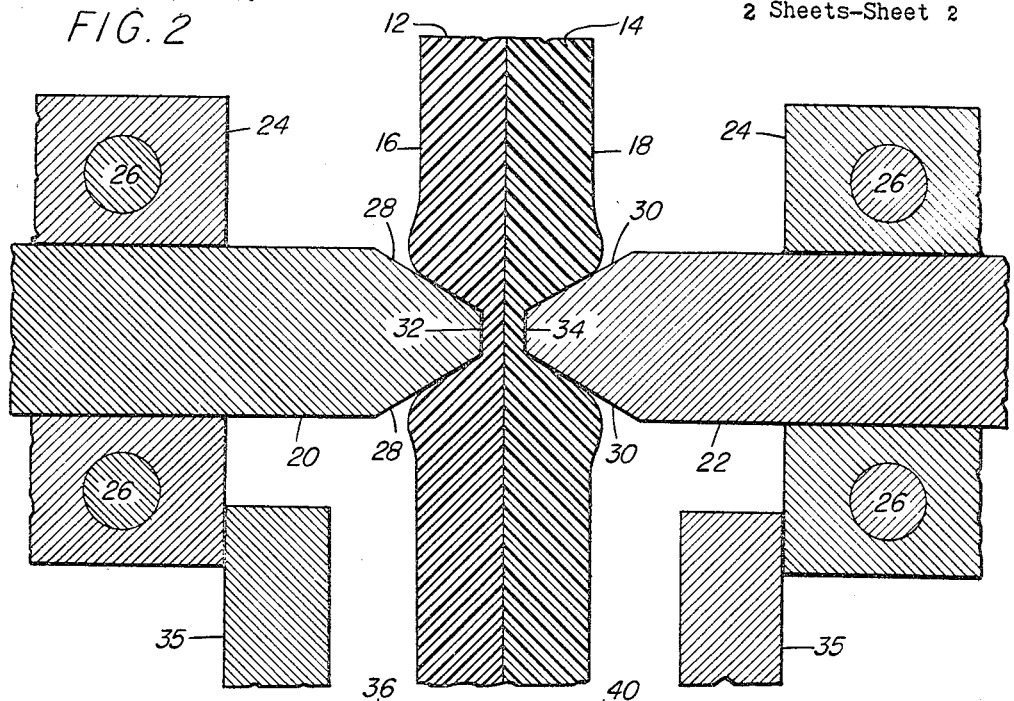
FIG. 2 is an enlarged, fragmentary, transverse sectional view of two layers of thermoplastic material being scored by two blades.

One embodiment of the new process is illustrated in FIG. 2 wherein two layers 12 and 14 of relatively thin layers of thermoplastic material (e.g., high impact, modified polystyrene produced by copolymerizing 13 parts of polybutadiene with 87 parts by weight of styrene) are assembled and pressed on their opposite faces 16 and 18 with two oppositely disposed, heated angular scoring blades 20 and 22 respectively.

Each of the blades 20 and 22 is mounted or clamped in a suitable blade holder 24 which encloses both sides of the blade. The holders are equipped with the electrical resistance or cartridge heaters 26 schematically shown for maintaining the blades at a suitable preselected, constant, elevated temperature for scoring. The blades 20 and 22 have beveled faces 28 and 30 respectively which converge at an included angle of 60°. The elongated scoring edges 32 and 34 of these blades may be ground to a width or edge thickness of 5 mils as illustrated in FIG. 2.

In scoring an assembly of thermoplastic layers 12 and 14 which typically may have a thickness of the order of about 10 mils each, the blades at a temperature of 280° F., for example, are advanced toward one another under a total force of 30 pounds per inch of length of one blade in the pair contacting the unheated (room temperature) thermoplastic material. Suitable reciprocating apparatus, as exemplified by pistons operated by compressed air, may be used for the purpose and adjustable stop or limiting devices 35 fastened to a fixed base (not shown) serve to halt the motion of the blades when the clearance between them is 5 mils. This clearance is suitable for forming a tear strip which retains sufficient strength for general protection of the contents of a package and yet may be easily torn by the householder with only the application of a moderate amount of force. As the blades advance and bear on the thermoplastic material, the layers 12 and 14 are heated and softened in the regions thereof in contact with an adjacent to the hot blades 20 and 22. Pressure exerted by the blades produces flow or displacement of the softened plastic material in the paths of the advancing blades, and this creates small ridges or beads on the surface of the plastic material adjoining the blade faces 28 and 30, that is along the edges of the grooves being formed by scoring edges 32 and 34, as shown in FIG. 2. As soon as the blades 20 and 22 have reached the point of minimum clearance, they are retracted to free the article which has a uniformly scored tear strip of the character described.

Figure 3:
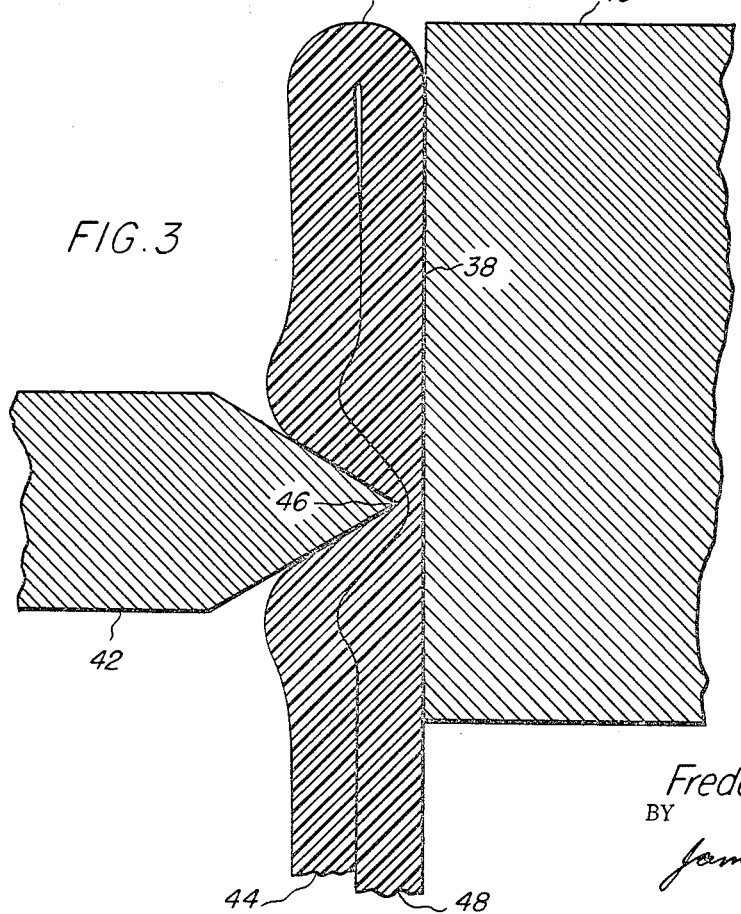
FIG. 3 is a similar enlarged, fragmentary, transverse sectional view of a single fold of heated thermoplastic material being scored to form a tear strip therein under pressure exerted between a single scoring blade and a flat anvil face.

Another modification of the invention in which the thermoplastic material must be heated to a relatively high temperature prior to scoring, is shown in FIG. 3. A single fold of 15 mil (0.015" gauge) high impact polystyrene 36 is preheated to a temperature of 300° F. and placed between the flat face 38 of a fixed anvil or backing member 40 and an unheated scoring blade 42 which is at a temperature of 80° F. The blade is pressed against the outer layer 44 of this fold using a force of 30 pounds per inch of length of the blade until the knife edge 46 of the blade 42 reaches to a point 6 mils from the face of the anvil. After the blade is withdrawn, some unusual results are observed. Although the blade edge 46 advanced 24 mils after contacting the face of the 15 mil thick layer 44, this outer layer is not cut through or parted. Instead each of the layers 44 and 48 is scored to an approximately equal depth, leaving only a thickness of plastic material of about 3 mils along the score line of each layer, thereby forming an intact but easily removable tear strip. In view of the fact that only one layer of thermoplastic material is in direct contact with the scoring blade, one would normally expect that layer to be either cut through or scored much more deeply than the other layer of plastic material; instead a surprising amount of plastic flow takes place in this operation with softened plastic material being displaced from the scored groove out of the path of the advancing scoring edge 46 and forming ridges or beads along the score line in each of the layers 44 and 48 on the face thereof which is closer to edge 46. In this particular embodiment, similar results in respect to an equal depth of scoring of two layers with a single blade are not obtainable when the blade and material temperatures are reversed, for the heated scoring blade apparently does not transfer enough heat to the cool plastic material, especially to the ulterior layer 48, to produce the necessary high plastic flow within a commercially feasible dwell or pressing time. However, the technique of scoring with two opposed heated blades may be utilized when it is desired to score two layers of unheated thermoplastic material to equal depths.

Although the present scoring process has been specifically described in reference to typical applications in which two layers of material or a single fold of material are scored, it may also be utilized in scoring a single layer of material or more than two layers. For example, a sheet or wall section of thermoplastic material of suitable flexibility may be scored to form grooves which are intended to facilitate folding rather than tearing. In such instances, it is contemplated that the material remaining in the grooves may range from about 10 to 30% of the original thickness.

The instant method may be employed in scoring thermoplastic materials which have a total thickness of at least about 10 mils and may range up to about 100 mils or more. In scoring tear strips in an assembly of a plurality of layers, the individual thickness of each such layer should generally be at least about 5 mils.

The bevel or the angle of convergence of the faces of the scoring blade or blades is also of significance as it has been found that blades having a convergence angle of 90° tend to form a rough and jagged score line. On the other hand, when two opposing blades are used, blades with sides converging at 15° usually deflect with unsatisfactory results upon approaching the point of minimum clearance; and this tendency is sometimes observed with blades having 3° angles. Good results are obtainable with pairs of blades having sides converging at 45° and even better results are obtained when the angle is 60°. In general, it is recommended that the blade convergence angle should not exceed about 80°, and preferably not be greater than about 75°; while in the case of double blade scoring, the minimum angle for each blade is desirably at least 35°, and preferably 40° or more.

The scoring blades are desirably made of a tool steel or another hardened alloy steel, such as those used in manufacturing knives. The blades may be sharpened to knife edges, but for improved wearing characteristics in prolonged operations, it may sometimes be desirable to grind down the edges of the blades until they have a uniform thickness between about 1 and 20 mils. For example, good results have been secured with blades having a uniform edge thickness in the 5 to 12 mil range. Such ground edges also resist nicking and are likely to be more resistant to deflection under pressure.

The scoring pressure or force used in the present process may be conveniently expressed in terms of pounds per linear inch of the length of one blade in contact with the thermoplastic material, and this, of course, corresponds to the length of the score or groove measured on one face only of the thermoplastic material. For example, a total of 90 pounds exerted between a pair of 3-inch blades in forming a 3 inch long score in each face of thermoplastic material is described as a scoring force of 30 pounds per inch.

In this connection, it might be mentioned that the same total force is usually employed regardless of whether two opposed knives are used or material is being scored between a single scoring blade and a flat backing member. Excessive forces split or part the layers of thermoplastic material even when a proper minimum clearance is maintained between the scoring members. On the other hand, when the force is inadequate, the scoring edge does not penetrate deeply enough into the material and there is an insufficient displacement or flow of plastic material from the scoring groove, so the resulting thicker tear strip requires excessive force for its removal and the tear line is likely to wander away from the score line. Heating to higher temperatures will not satisfactorily compensate for an insufficient scoring pressure, and overheating causes the material being scored to split or part along the scoring line. In the case of impact resistant polystyrene, the range of suitable scoring pressures is rather narrow as it only extends from about 23 to 33 pounds per inch.

In the enlarged views of FIGS. 2 and 3 wherein the thickness of the layers of material being scored is exaggerated, the scoring blades 20, 22 and 42 are shown at their points of final or minimum clearance between blades and backing members, which latter may also be a blade as shown in FIG. 2. The thickness of the thermoplastic material remaining in the scored groove is fixed by this clearance when the blade and material temperatures are correlated as described earlier; and such thickness and its uniformity are important factors in determining the tearing characteristics of the tear strip. For high impact polystyrene, this minimum clearance of the blades may amount to from about 3 to 7 mils in forming tear strips, and the range of 4 to 6 mils is preferred for most purposes. When the minimum clearance is below 3 mils, there is too great a tendency for the plastic material to part during scoring, and clearances in excess of 7 mils result in tear strips which the householder will find difficult to tear. It is thought that minimum scoring clearances between about 3 and 7 mils are suitable for scoring a wide variety of thermoplastic materials. Such clearances, of course, are not significant in the case of sheet material which is being scored for folding purposes. Uniformity in the thickness of the score line is a function of the straightness of the blade edge; and blades with nicked or notched edges generally should be discarded or reground.

The present invention may be practiced in scoring for many different uses a wide variety of thermoplastic materials including those containing polystyrene, polyethylene, polypropylene, polyallomers, nylon, formaldehyde polymers, plasticized polyvinyl chloride and related vinyl polymers, nitrocellulose, ethyl cellulose, cellulose acetate, cellulose acetate-butyrate, polymethylmethacrylate and acrylonitrile-butadiene-styrene resins to name only a few for illustrative purposes. Such resins may be composed of homopolymers, copolymers or various blends thereof; and they may also contain various additives known in the art, including colorants, plasticizers, heat stabilizers, extenders, fillers, and inhibitors against degradation due to oxidation, ultraviolet light, etc.

The sheets or articles to be scored may be fabricated by a number of conventional techniques including, inter alia, extrusion, thermoforming under heat and a fluid pressure differential (e.g. vacuum forming), injection molding, compression molding, blow molding, calendering and laminating.

Many other such variations or modifications of the present invention may be made without departing from its purview; accordingly, this invention should not be construed as limited in any particulars except as may be recited in the appended claims or required by the prior art.

I claim:

1. A method of scoring thermoplastic material without abrasion to form a tear strip which comprises disposing relatively thin thermoplastic material having a total thickness greater than about 10 mils between a backing member having a rigid surface and a blade of a scoring member having sides converging at an angle not greater than about 80 degrees, to an edge having a thickness not exceeding about 20 mils, said material comprising at least one layer and with no layer thereof having a thickness less than about 5 mils, maintaining said blade at a temperature corresponding with one of the rectangular coordinates of a point located within the area designated ABCDE in the accompanying temperature diagram, maintaining said material at a correlated average temperature corresponding with the other rectangular coordinate of said point, and pressing said material with said blade and said backing member in contact with opposite faces of said material by exerting a force of between about 23 and 33 pounds per inch of length of said blade in contact with said material to score a groove in said material to a depth predetermined by maintaining a predetermined minimum clearance of about 3 to 7 mils between said blade and said backing member while avoiding parting said thermoplastic material.

2. A method according to claim 1 in which said thermoplastic material is derived from styrene.

3. A method according to claim 1 in which said backing member is also provided with a blade for scoring said thermoplastic material, and each of said blades has sides converging at an angle between about 35 and 80 degrees.

4. A method according to claim 1 in which at least two layers of said thermoplastic material at an average temperature between about 260 and 320° F. are pressed between said blade and a substantially flat surface of said backing member to form grooves of substantially equal depth in each said layer.

5. A method according to claim 1 in which said thermoplastic material is heated to an average temperature substantially higher than the temperature of said blade.

6. A method according to claim 1 in which said blade is heated to a temperature substantially higher than the average temperature of said thermoplastic material.

7. A method of scoring thermoplastic material without abrasion to form a tear strip which comprises disposing a plurality of superimposed layers of relatively thin thermoplastic material having a total thickness greater than about 10 mils between a backing member having a rigid surface and a blade of a scoring member having the sides of the blade converging at an angle not greater than about 75 degrees to an edge having a thickness not exceeding about 20 mils, said material comprising an impact resistant copolymer of an elastomer with a major proportion of styrene in the form of layers at least about 5 mils thick, maintaining said blade at a temperature corresponding with one of the rectangular coordinates of a point located within the area designated ABCDE in the accompanying temperature diagram, maintaining said material at a correlated average temperature corresponding with the other rectangular coordinate of said point, and pressing and scoring said thermoplastic material with said blade and said backing member in contact with opposite faces of said material by exerting a force of between about 23 and 33 pounds per inch of length of said blade in contact with said material while maintaining a minimum clearance of about 4 to 6 mils between said blade and said backing member.

8. A method according to claim 7 in which said backing member is also provided with a blade for scoring said thermoplastic material, and each of said blades has sides converging at an angle between about 40 and 75 degrees.

9. A method according to claim 7 in which said thermoplastic material is maintained at an average temperature between about 80 and 160° F. while being scored.

10. A method according to claim 7 in which a single fold of thermoplastic material maintained at an average temperature between 260 and 320° F. is pressed between said blade and a substantially flat surface of said backing member to form grooves of substantially equal depth in each layer of said fold.

References Cited

UNITED STATES PATENTS

| | | | |
|---|---|---|---|
| 2,556,605 | 6/1951 | Taber | 18—19 |
| 2,589,022 | 3/1952 | Page | 18—19 |
| 2,627,629 | 2/1953 | Triolo | 18—19 |
| 3,166,790 | 1/1965 | Keyes | 18—19 |
| 3,274,047 | 9/1966 | Sloan | 161—46 |

ROBERT F. WHITE, *Primary Examiner.*

R. R. KUCIA, *Assistant Examiner.*